US006948083B2

(12) United States Patent
Eguchi et al.

(10) Patent No.: US 6,948,083 B2
(45) Date of Patent: Sep. 20, 2005

(54) GAME APPARATUS AND A POWER SAVE MODE MANAGEMENT PROGRAM EXECUTED BY THE SAME

(75) Inventors: Katsuya Eguchi, Kyoto (JP); Hisashi Nogami, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 545 days.

(21) Appl. No.: 10/267,046

(22) Filed: Oct. 9, 2002

(65) Prior Publication Data

US 2003/0096650 A1 May 22, 2003

(30) Foreign Application Priority Data

Nov. 20, 2001 (JP) ........................................ 2001-354811

(51) Int. Cl.[7] ................................................ G06F 1/32
(52) U.S. Cl. ........................ 713/323; 345/169; 463/24; 455/574
(58) Field of Search ........................ 345/169; 455/574; 463/24; 713/323

(56) References Cited

U.S. PATENT DOCUMENTS 5,812,954 A * 9/1998 Henriksson ................. 455/566
5,865,677 A * 2/1999 Goldfarb et al. ............... 463/9
6,788,285 B2 * 9/2004 Paolucci et al. ............ 345/156
6,874,094 B2 * 3/2005 Parker ........................ 713/310

OTHER PUBLICATIONS

Cybiko, "Cybiko Xtreme Quick Start Guide", version 2.2, 2001.*

* cited by examiner

Primary Examiner—Chun Cao
Assistant Examiner—Albert Wang
(74) Attorney, Agent, or Firm—Nixon & Vanderhye P.C.

(57) ABSTRACT

During a sleep mode, if an input made via operation switches matches a resume condition, a portable game apparatus cancels the sleep mode and generates a resume window. Next, a timer which counts down a predetermined length of time is set off, and the resume window is displayed on an LCD. Then, if an instruction from a user instructs a resume from the sleep mode, the resume window is erased, and game data and a game image which existed immediately before entering the sleep mode are restored, and the normal game processing is resumed. On the other hand, if inactivity for the predetermined length or longer with respect to the operation switches is detected, or if an option of not choosing to resume has been selected by the user, the sleep mode is again entered.

20 Claims, 7 Drawing Sheets

GAME APPARATUS AND A POWER SAVE MODE MANAGEMENT PROGRAM EXECUTED BY THE SAME

BACKGROUND OF THE INVENTION

1. Field of the Invention

The present invention relates to an electronic appliance and a power save mode management program to be executed by the same. More particularly, the present invention relates to a game apparatus having a power save mode, and a power save mode management program to be executed by the game apparatus.

2. Description of the Background Art

In a portable electronic appliance running on an internal battery, e.g., a mobile phone terminal or a mobile information terminal, it has always been important to minimize power consumption in order to realize a operation duration. As a technique for minimizing power consumption, portable electronic appliances are typically equipped with a power save mode. For example, in a power save mode, supply of power to a display device may be stopped or the clock frequency for the CPU may be lowered when it is determined that no input has been made to the portable electronic appliance for a predetermined period of time, thereby reducing the power consumption of the overall portable electronic appliance. For the sake of users' convenience, a power save mode is typically cancelled in such a manner that, as soon as any input is made during the power save mode of the portable electronic appliance, the portable electronic appliance returns to a normal mode so as to be restored to a state which existed before the power save mode was entered.

Some non-portable type personal computers and the like also have a power save mode. As in the case of portable electronic appliances, in a power save mode, supply of power to a display device may be stopped or a screen saver may be displayed when it is determined that no input has been made for a predetermined period of time, and, as soon as any input is made during the power save mode, the personal computer or the like returns to a normal mode so as to be restored to a state which existed before the power save mode was entered.

However, there has been a difficulty in introducing a power save mode to a portable game apparatus. Firstly, due to its nature as a device for allowing a user to primarily play games thereon, a portable game apparatus is typically designed so that any operation buttons provided thereon have a profile which protrudes from the housing in order to facilitate operation by the user. Moreover, a portable game apparatus is likely to be carried around by a user in a bag or in a pocket. Therefore, if the above-described technique, where any input being made during a power save mode immediately results in the resumption of a game processing mode (i.e., a normal mode), is applied to a portable game apparatus, it might be possible for the game processing mode to be inadvertently resumed when any of the protruding operation buttons is pressed, since the portable game apparatus is likely to come into contact with surrounding objects as it is carried around by the user in a bag or a pocket. Furthermore, depending on the nature of the game, such an inadvertent resumption of the game processing mode during transportation may even allow the game to progress on its own from the state existing before the power save mode was entered, eventually to a game-over, before the user knows.

On the other hand, in order to prevent the portable game apparatus from inadvertently returning to the game processing mode during transportation in a power save mode, the portable game apparatus might be arranged so that the power save mode can only be cancelled based on a combination of a plurality of operation buttons. In this case, however, the user must remember the operation procedure concerning the plurality of operation buttons for canceling the power save mode. Hence, once the operation procedure is forgotten, it becomes impossible to return to the game processing mode. Moreover, in the case where the portable game apparatus is arranged so that the power save mode is canceled by simultaneously pressing a plurality of operation buttons, a user wondering why the portable game apparatus is not responsive to the pressing of a single operation button may be urged to turn the apparatus off.

SUMMARY OF THE INVENTION

Therefore, an object of the present invention is to provide a game apparatus where a power save mode can be canceled by a relatively easy operation and yet an inadvertent resumption of a game processing mode is prevented, and a power save mode management program to be executed by the game apparatus.

The present invention has the following features to attain the above object.

A first aspect of the present invention is directed to a power save mode management program contained in a medium which is readable to a computer (e.g., a CPU 15 of the embodiment described later below) embodying a game apparatus (a portable game apparatus 1) having a power save mode (a sleep mode) for minimizing internal power consumption, wherein the power save mode management program controls transition to the power save mode and resume from the power save mode, the program comprising a first resume determination step (realized by a CPU executing step S31), a power save mode cancellation step (S32), a second resume determination step (S37 and S38), and a game processing mode resume step (S40). The first resume determination step determines, during the power save mode, whether a first operation signal generated from an operation switch (an operation switch 14) provided on the game apparatus matches a predetermined primary resume condition or not. The power save mode cancellation step cancels the power save mode if the first resume determination step determines that the first operation signal matches the primary resume condition. The second resume determination step determines, after the power save mode cancellation step cancels the power save mode, whether a second operation signal generated from the operation switch matches a predetermined secondary resume condition or not. The game processing mode resume step resumes a game processing mode being processed by the game apparatus immediately before entering the power save mode if the second resume determination step determines that the second operation signal matches the secondary resume condition. Thus, since two resume conditions need to be satisfied in order to resume a game processing mode from a power save mode intended to minimize power consumption, the portable game apparatus is prevented from inadvertently returning to the game processing mode. In other words, even when protruding operation switches provided on (a controller of) the portable (or non-portable type) game apparatus come in contact with surrounding objects while in the power save mode, the game apparatus is prevented from inadvertently returning to the game processing mode due to the accidental pressing of the operation switches, so that any unintended further progress in the game can be forestalled. As will be appreciated, any reference numerals enclosed in parentheses, which are added in order to facilitate understanding the present invention, are in no way restrictive of the scope of the invention.

The power save mode management program may further comprise an operation procedure displaying step (S36). The operation procedure displaying step displays an operation procedure for generating the second operation signal when the power save mode is cancelled by the power save mode cancellation step (displaying of a resume window RW). Thus, since a resume procedure for returning to the game processing mode is displayed immediately after the power save mode is canceled, the user will find it easy to resume the game processing mode without having to remember the procedure.

In an example, the operation procedure displaying step may comprise displaying a plurality of options (as exemplified by a resume window RW1), and the secondary resume condition may be an option to resume from the power save mode selected by a user from among the options displayed by the operation procedure displaying step. In this case, since the procedure for resuming the game processing mode is displayed in the form of an option (see the resume window RW1), the game processing mode can be resumed more easily.

In another example, the operation procedure displaying step may comprise indicating a combination of a plurality of said operation switches, and the secondary resume condition may be an operation signal generated corresponding to the combination of the plurality of said operation switches indicated by the operation procedure displaying step. In this case, since the procedure for resuming the game processing mode is displayed in the form of a combination of operation switches (as exemplified by a resume window RW2), an inadvertent resumption of the game processing mode can be made even more difficult.

The power save mode management program may further comprise a power save mode re-transition step (S42, S43). The power save mode re-transition step again establishes (S42, S43) the power save mode if the second operation signal is not generated (S41) within a predetermined period of time after the power save mode is canceled by the power save mode cancellation step. Thus, if the game apparatus is left inactive after the primary resume condition is satisfied, the power save mode is entered again so as to minimize power consumption.

In one example, the primary resume condition is the first operation signal being generated during a period which is equal to or less than a predetermined period of time (S31). In this case, by prescribing the predetermined period of time at a relatively small value (e.g., 0.5 seconds or 1 second or less), such pressing can be distinguished from a longer period of pressing the operation switches (as in the case where an operation switch keeps being pressed while within a bag or the like). As a result, it becomes possible to distinguish a user input which is intended to cancel the power save mode with a practical certainty, thereby preventing an inadvertent resume from the power save mode more effectively.

In another example, the primary resume condition is an operation signal generated from a predetermined combination of a plurality of said operation switches (S31). In this case, since the primary resume condition is determined to have been satisfied by the activation of a combination of a plurality of operation switches, it becomes possible to even more clearly distinguish a user input which is intended to cancel the power save mode with a practical certainty from accidental activation of the operation switches, thereby preventing an inadvertent resume from the power save mode even more effectively.

The power save mode management program may further comprise an operation procedure displaying step (displaying a window PW indicating a resume procedure). The operation procedure displaying step displays an operation procedure for generating the first operation signal when entering the power save mode. Thus, by previously indicating a primary resume procedure from the power save mode to the user, it becomes easier for the user to execute an operation to resume from the power save mode.

The power save mode management program may further comprise a game data saving step (S12 to S14) and a power save mode transition step (S15 tot S23). Upon determining that a third operation signal generated from the operation switch matches a predetermined primary transition condition (S12) or that no operation signal has been generated for a predetermined period of time during the game processing mode (S13), the game data saving step saves game data stored in a CPU register, an internal RAM, or the like (including an instruction in a program under execution) during the game processing mode, in a memory space which is not to be used for the subsequent execution of the program. Thereafter, the power save mode transition step stores instructions and the like associated with the program in the CPU register, an internal memory, or the like, in order to commence the program from the first resume determination step, and the power save mode of the game apparatus is activated (i.e., the power save mode is established). As a result, it is possible to establish the power save mode in a compulsory or non-compulsory manner. Since the program is executed beginning from the first resume determination step immediately after resuming from the power save mode, the game can be prevented from making any unintended progress which is unknown to the user immediately after resuming the game processing mode.

The power save mode management program may further comprise a transition window displaying step (S17). The transition window displaying step displays a transition window (SW) for allowing a user to confirm whether or not to enter the power save mode before the first resume determination step is commenced. Thus, since the transition window allows the user to confirm whether or not to enter the power save mode, an inadvertent transition to the power save mode can be prevented.

A second aspect of the present invention is directed to a game apparatus having a power save mode for minimizing internal power consumption, comprising an operation switch, a first resume determination section (S31), a power save mode cancellation section (S32), a second resume determination section (S37 and S38), and a game processing mode resume section (S40). The operation switch provided on a surface of a housing of the game apparatus generates an operation signal in response to a user operation. The first resume determination section determines whether a first operation signal generated from the operation switch during the power save mode matches a predetermined primary resume condition or not. The power save mode cancellation section cancels the power save mode when the first resume determination section determines that the first operation signal matches the primary resume condition. The second resume determination section determines whether a second operation signal generated from the operation switch after the power save mode is canceled by the power save mode cancellation section matches a predetermined secondary resume condition or not. The game processing mode resume section resumes the game processing mode being processed by the game apparatus immediately before entering the power save mode if the second resume determination section determines that the second operation signal matches the secondary resume condition. Thus, since two resume conditions need to be satisfied in order to resume a game processing mode from a power save mode intended to minimize power consumption, the portable game apparatus is prevented from inadvertently returning to the game processing mode. In other words, even when protruding operation switches provided on (a controller of) the portable (or non-portable type) game apparatus come in contact with surrounding objects while in the power save mode, the game apparatus is prevented from inadvertently returning to the game processing mode due to the pressing of the operation switches, so that any unintended progress in the game can be forestalled.

The game apparatus may further comprise an operation procedure displaying section. The operation procedure displaying section displays an operation procedure for generating the second operation signal when the power save mode is cancelled by the power save mode cancellation section.

In one example, the operation procedure displaying section may display a plurality of options, and the secondary resume condition may be an option to resume from the power save mode selected by a user from among the options displayed by the operation procedure displaying section.

In another example, the operation procedure displaying section may indicate a combination of a plurality of said operation switches, and the secondary resume condition may be an operation signal generated corresponding to the combination of the plurality of said operation switches indicated by the operation procedure displaying section.

The game apparatus may further comprise a power save mode re-transition section (S42, S43). The power save mode re-transition section again establishes the power save mode if the second operation signal is not generated within a predetermined period of time after the power save mode is canceled by the power save mode cancellation section.

In one example, the primary resume condition may be the first operation signal being generated during a period which is equal to or less than a predetermined period of time.

In another example, the primary resume condition may be an operation signal generated from a predetermined combination of a plurality of said operation switches.

The game apparatus may further comprise an operation procedure displaying section (displaying of a resume window RW). The operation procedure displaying section displays an operation procedure for generating the first operation signal when entering the power save mode.

The game apparatus may further comprise a game data saving section (S12 to S14) and a power save mode transition section (S15 to S23). Upon determining that a third operation signal generated from the operation switch matches a predetermined primary transition condition or that no operation signal has been generated for a predetermined period of time during the game processing mode, the game data saving section saves game data stored in a CPU register, an internal RAM, or the like (including an instruction in a program under execution) during the game processing mode, in a memory space which is not to be used for the subsequent execution of the program. Thereafter, the power save mode transition section stores instructions and the like associated with the program in the CPU register, an internal memory, or the like, in order to commence the program from the first resume determination section, and the power save mode of the game apparatus is activated (i.e., the power save mode is established).

The game apparatus may further comprise a transition window displaying section (S17). The transition window displaying section displays a transition window for allowing a user to confirm whether or not to enter the power save mode before commencing the first resume determination section.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
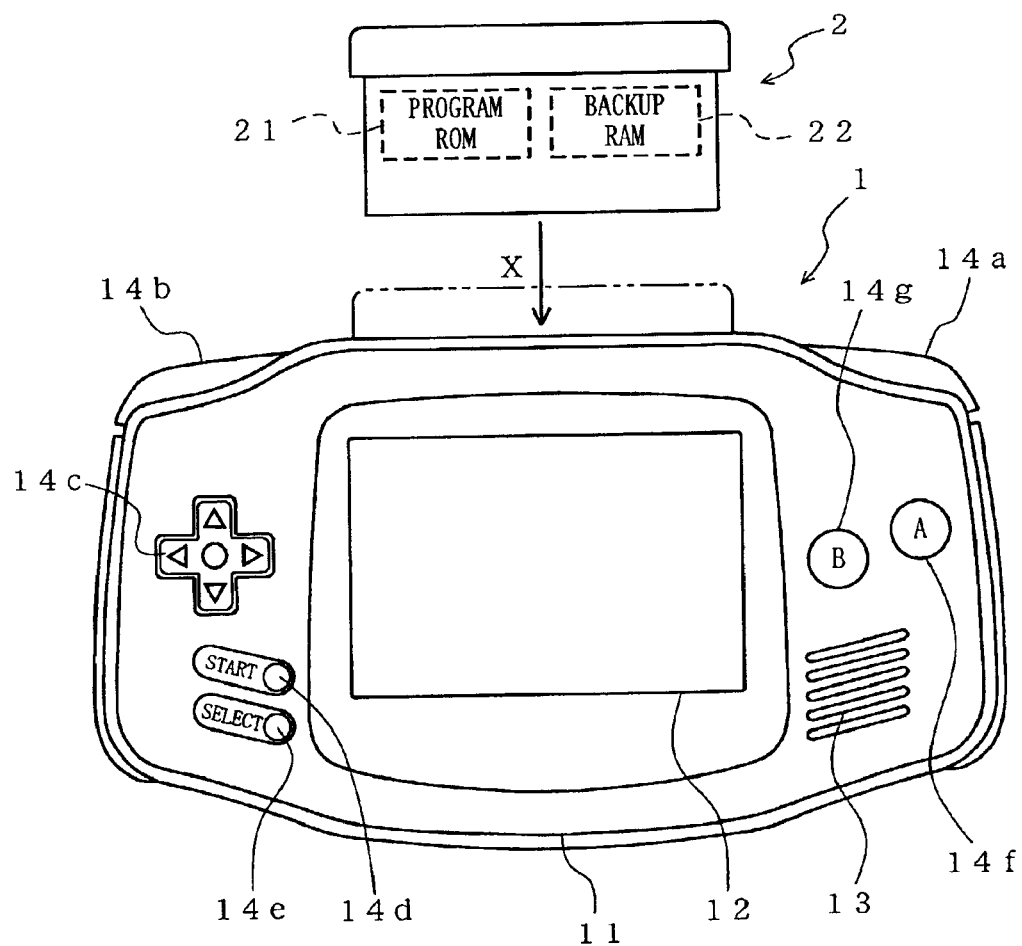
FIG. 1 is a plan view of a portable game apparatus 1 according to an embodiment of the present invention.

FIG. 1 is a plan view of a portable game apparatus 1 according to an embodiment of the present invention. Note that the present invention is not limited to a portable game apparatus, but also is applicable to a non-portable type game apparatus. As shown in FIG. 1, the portable game apparatus 1 utilizes a cartridge 2 as an information storage medium for a game program or the like. When the cartridge 2 is mounted on the portable game apparatus 1 in an X direction shown in FIG. 1, a program ROM 21 and a back-up RAM 22 included in the cartridge 2 are electrically coupled to the portable game apparatus 1. The portable game apparatus 1 includes a housing 11, and a liquid crystal display (LCD) device 12 is formed in a central region of one of the principal faces (i.e., the face shown in FIG. 1) of the housing 11. On the outer vacant regions neighboring the LCD 12 and on the side faces of the housing 11, a loudspeaker 13, and operation switches 14a to 14g are provided. The specific operation instructions which are executed as the operation switches 14a to 14g are activated may vary depending on the content of the game program which is processed by the portable game apparatus 1. Typically, however, the operation switches 14a to 14c provide instructions as to directions of movement; the operation switches 14d and 14e provide operational instructions such as "START" and "SELECT", respectively; and the operation switches 14f and 14g provide operational instructions such as "A" and "B", respectively.

Figure 2:
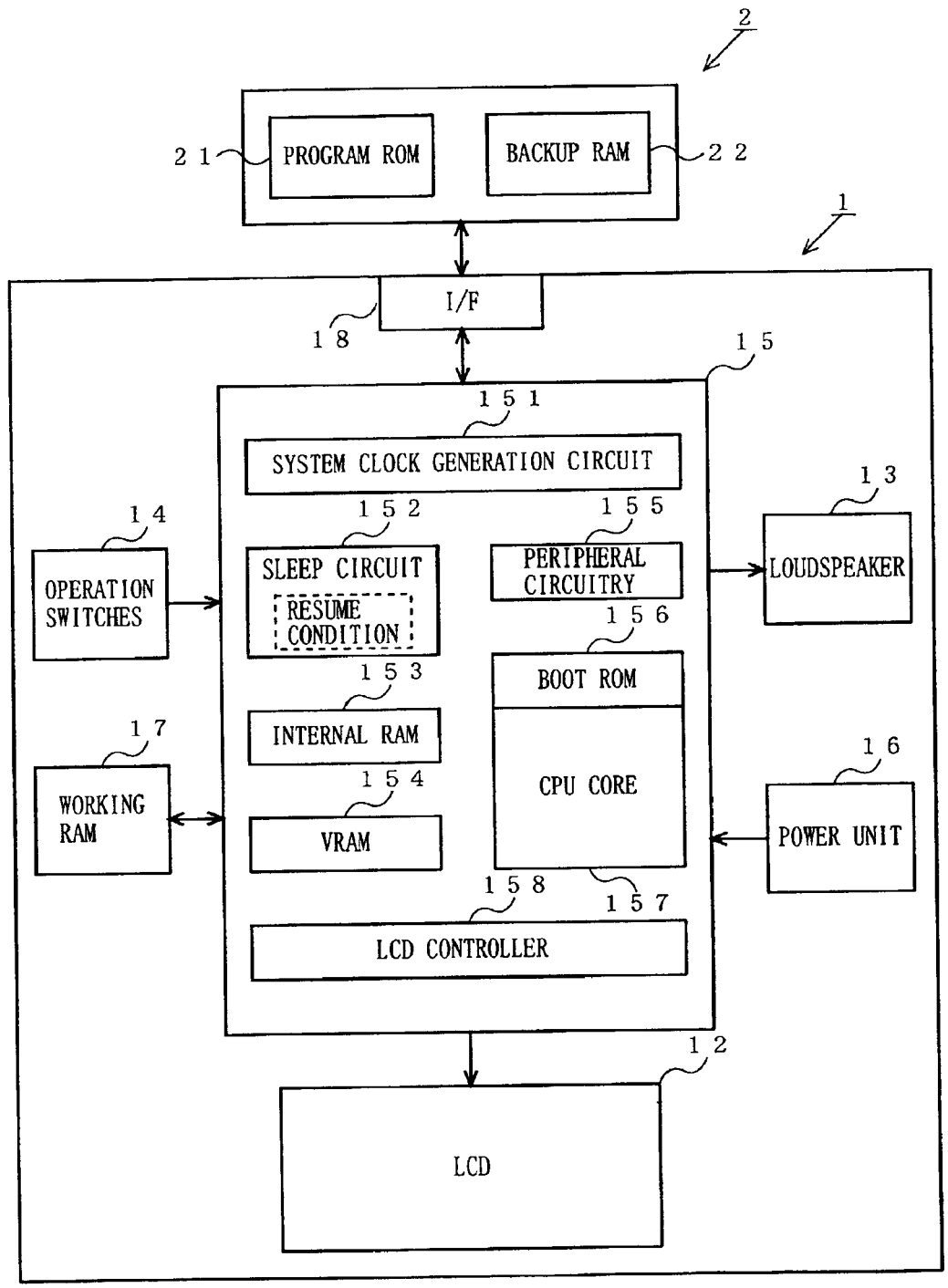
FIG. 2 is a functional block diagram illustrating the portable game apparatus 1 and a cartridge 2 shown in FIG. 1.

FIG. 2 is a functional block diagram illustrating the portable game apparatus 1 and the cartridge 2 shown in FIG.

1. As shown in FIG. 2, the portable game apparatus 1 includes the LCD 12, the loudspeaker 13, the operation switches 14, a central processing unit (CPU) 15, a power unit 16, a working RAM 17, and an interface (I/F) 18. The CPU 15 includes a system clock generation circuit 151, a sleep circuit 152, an internal RAM 153, a video RAM (VRAM)154, a peripheral circuitry 155, a boot ROM 156, a CPU core 157, and an LCD controller 158. The cartridge 2 includes the aforementioned program ROM 21 and back-up RAM 22.

The program ROM 21 stores a game controlling program which describes the content of a game to be played on the portable game apparatus 1 as well as image and audio data therefor. Based on this game controlling program, the CPU 15 operates in a game processing mode. Furthermore, in the case where the game controlling program supports a power save mode in which the portable game apparatus 1 operates with a reduced power consumption (hereinafter referred to as a "sleep mode"), the program ROM 21 stores a sleep mode management program describing the operation during the sleep mode. Specifically, the sleep mode management program contains a transition management program which describes the operation of entering the sleep mode and a resume management program which describes the operation of returning from the sleep mode to the game processing mode. Alternatively, the sleep mode management program may be stored in any storage medium other than the program ROM 21 included in the cartridge 2. The sleep mode will be described in more detail later.

The CPU core 157 processes a boot program stored in the boot ROM 156, operates in the game processing mode based on the game controlling program stored in the program ROM 21, and also performs sleep mode processing based on the sleep mode management program. The CPU core 157 accesses the program ROM 21 via the I/F 18. The CPU core 157 causes game images and images representing a sleep mode operation, based on the processing results of the aforementioned programs, to be displayed on the LCD 12 via the LCD controller 158, and sounds and sound effects to be reproduced by the loudspeaker 13. After the CPU core 157 has executed the boot program, the transition management program and the resume management program stored in the program ROM 21 are stored into the working RAM 17, and a transition window image indicating that a transition to the sleep mode is in progress and a resume window image indicating that a resume from the sleep mode is in progress are stored in the VRAM 154. While the CPU core 157 operates in the game processing mode, data for processing and register data are stored in the internal RAM 153, and game images to be displayed on the LCD 12 are stored in the VRAM 154.

The sleep circuit 152 continues processing during the sleep mode. If an input which is made via the operation switch 14 during the sleep mode matches a resume condition stored therein, the sleep circuit 152 sends a signal for canceling the sleep mode to the CPU core 157. The resume condition may be written as an initial condition before the shipment of the portable game apparatus 1, or may arbitrarily be set by the user.

The peripheral circuitry 155 handles sound processing, DMA (direct memory access), as well as processing related to a timer and input/output control. The power unit 16 supplies power to the aforementioned functional blocks under the control of the CPU 15.

Figure 3:
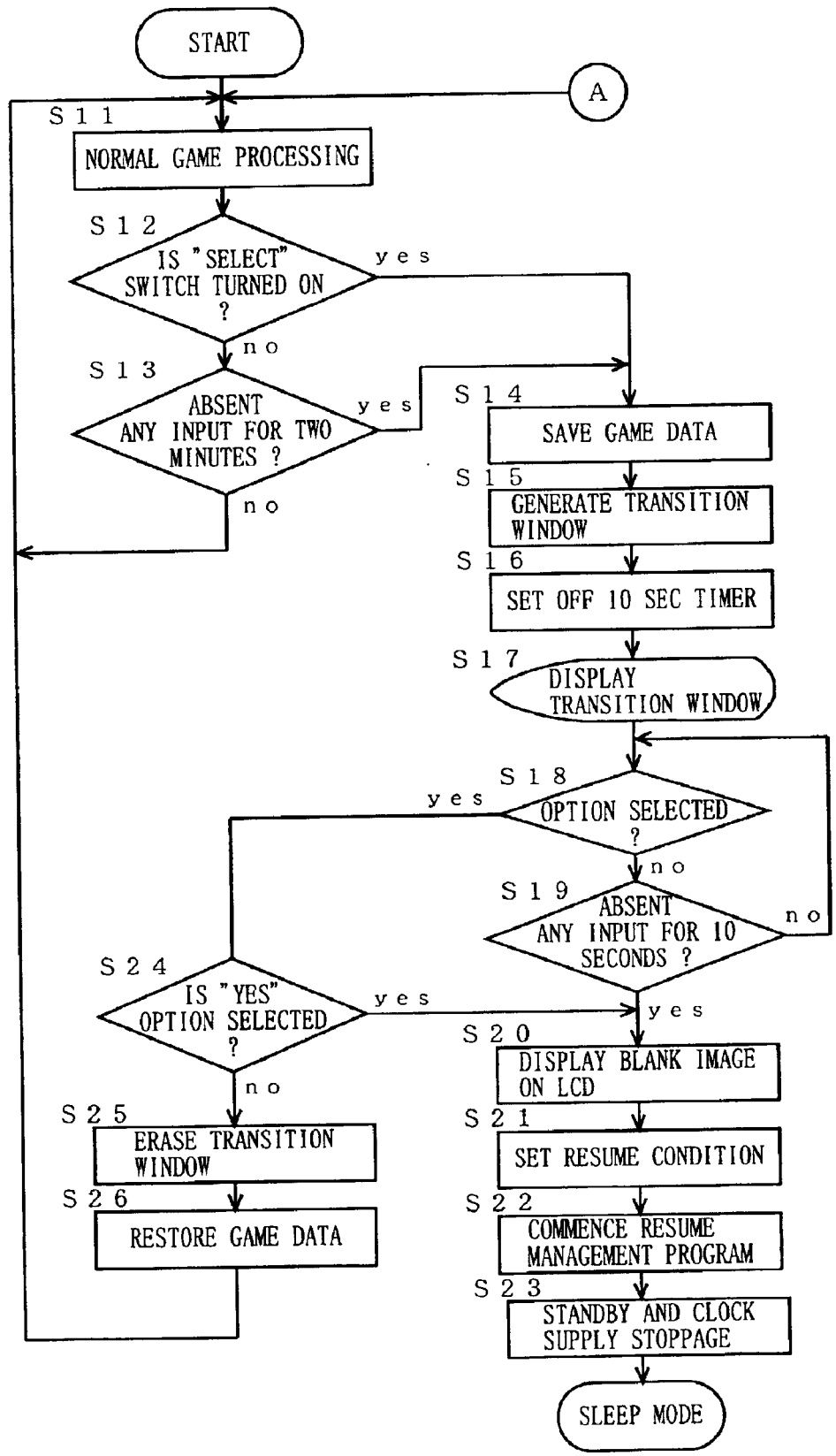
FIG. 3 is a flowchart illustrating an operation of the portable game apparatus shown in FIG. 1 by which the portable game apparatus enters a sleep mode.

Next, an operation of the portable game apparatus 1 by which the portable game apparatus 1 enters a sleep mode will be described. FIG. 3 is a flowchart illustrating an operation of the portable game apparatus 1 by which the portable game apparatus 1 enters a sleep mode.

Referring to FIGS. 2 and 3, while the CPU 15 is operating in the game processing mode, i.e., performing game processing based on the game controlling program (step S11), if a specific switch, e.g., a "SELECT" switch (as in the operation switch 14e) is turned on (step S12) or if there has been two minutes of absence of inputs from any other operation switches 14 (step S13), then the sleep mode transition management program stored in the working RAM 17 is executed, and control proceeds to step S14. On the other hand, if the "SELECT" switch has not been turned on and there has been an input from another operation switch 14 during the last two minutes while the CPU 15 is operating in the game processing mode, control returns to step S11 to continue game processing. The condition of step S12 corresponds to a "primary transition condition" as defined under the present invention. The input from the specific switch (e.g., the operation switch 14e) corresponds to a "third operation signal" as defined under the present invention.

Next, the CPU 15 saves (or stores) data present during game processing in the processing mode, such as game data in an internal register of the CPU core 157, data present at a specific address of the internal RAM 153, and data of the game image stored in the VRAM 154, in the internal RAM 153, the working RAM 17, and in the other memory regions of the VRAM 154 (step S14). As a result, after returning from the sleep mode, it is possible to return to a particular point in the game progression which existed immediately before entering the sleep mode. In the VRAM 154, the game image may be saved by simply switching the memory spaces used for displaying. Thereafter, control proceeds to the next step.

Next, as the CPU core 157 executes the transition management program, the CPU 15 generates a transition window for asking the user whether or not to enter the sleep mode, and stores the generated transition window in the VRAM 154 (step S15). Thereafter, control proceeds to the next step.

Figure 4:
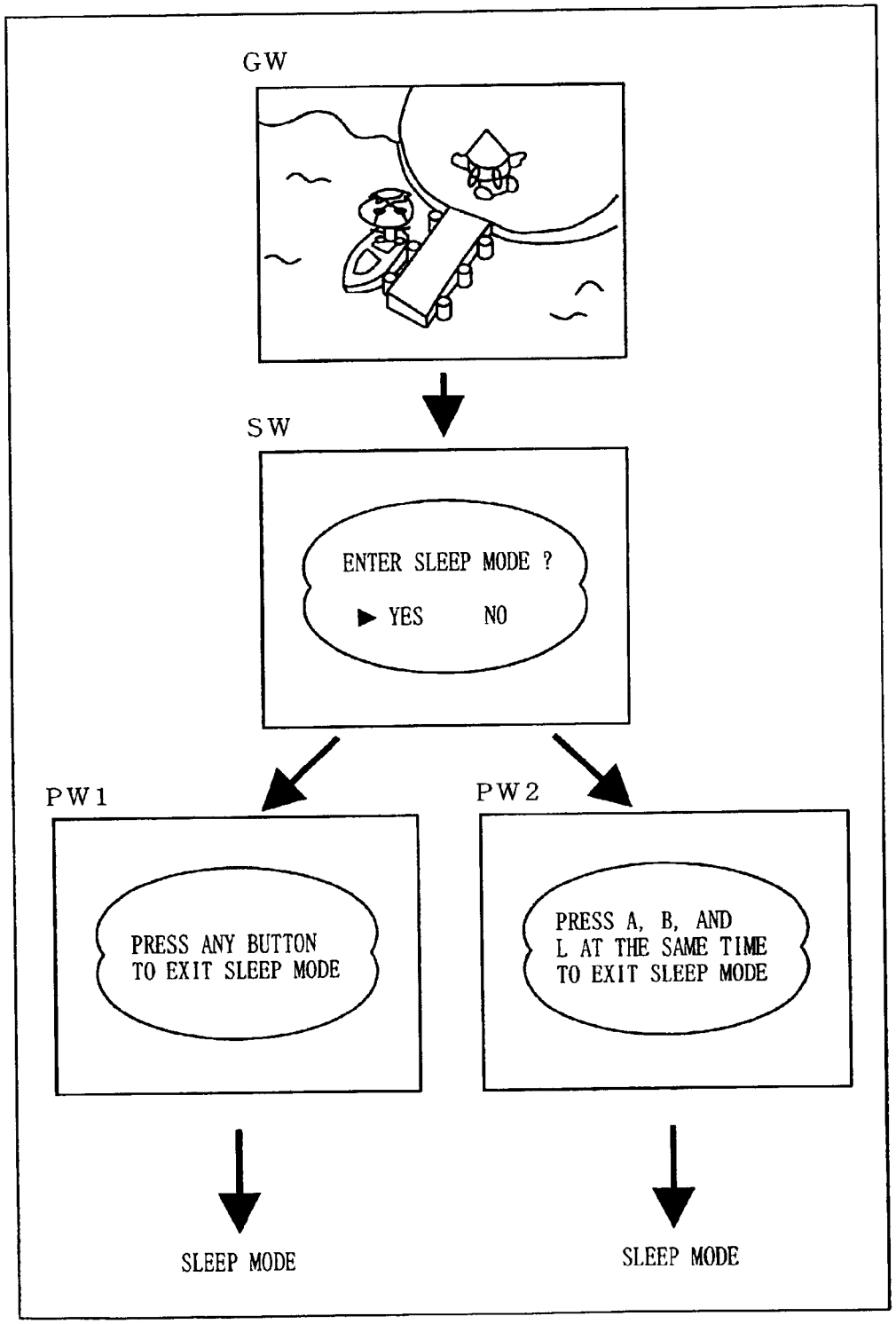
FIG. 4 illustrates exemplary windows which may be displayed on a LCD 12 shown in FIG. 1 to indicate switch operations for returning from a sleep mode.

Next, the CPU 15 sets off a timer which counts down ten seconds, for example (step S16), and causes the transition window to be displayed on the LCD 12 via the LCD controller 158 (step S17). FIG. 4 illustrates example transition windows which may be displayed on the LCD 12. In FIG. 4, a game image GW which has been displayed on the LCD 12 during the game processing is replaced by a transition window SW as step S17 is executed. In the case of the exemplary transition window SW shown in FIG. 4, the user is prompted to decide whether or not to enter the sleep mode based on a YES-NO selection of sleep mode transition. In the transition window SW, "enable sleep mode transition" (i.e., "YES") is pointed to by default. The duration (e.g., ten seconds) of the timer which is set at step S16 defines a period for waiting for the user to make a decision as to whether or not to enter the sleep mode based on the transition window SW which is continuously displayed on the LCD 12 during this period.

Referring back to FIGS. 2 and 3, if the user has not selected an option in the transition window SW displayed at step S17 (step S18) and no input has been made via the operation switches 14 for ten seconds since the timer was set at step S16 (step S19), or if it is determined that a "Yes" option has been selected in the transition window (step S24), then the CPU 15 proceeds to step S20 to perform an operation for entering the sleep mode. On the other hand, if it is determined that a "No" option has been selected in the transition window (step S24), then the CPU 15 proceeds to step S25 instead of entering the sleep mode.

As described above, when no input has been made via the operation switches 14 for ten seconds, or if it is determined that the "Yes" option has been selected in the transition window, the CPU 15 displays a blank image on the LCD 12 in order to erase the transition window from the LCD 12 (step S20). Although erasure of the display on the LCD 12 could instead be achieved by stopping the operation of the LCD controller 158, it is preferable to display a blank image because, if the LCD controller 158 is stopped first, noise and the like may appear on the LCD 12. Thereafter, control proceeds to the next step S21.

Before executing step S20, in order to present a procedure to resume from the sleep mode to the user (hereinafter referred to as a "resume procedure" (described later)), a window indicating a switch operation which is required to resume from the sleep mode may be displayed on the LCD 12. For example, as shown in FIG. 4, in the case where a resume from the sleep mode is triggered by an input from (i.e., activation of) any arbitrary operation switch 14, a window PW1 indicating a resume procedure, e.g., "Press any button to exit sleep mode" may be displayed. In the case where a resume from the sleep mode is triggered by an input from (i.e., activation of) the operation switches 14 in a predetermined combination or order, a window PW2 indicating a resume procedure in accordance with the required operation procedure for the operation switches 14, e.g., "Press A, B, and L at the same time to exit sleep mode", may be displayed. By controlling the CPU 15 so as to perform the process of step S20 after displaying the window PW1 or PW2 indicating such a resume procedure on the LCD 12 for a predetermined period of time (e.g., ten seconds) or until activation of any arbitrary operation switch 14, it can be ensured that the user surely understands the resume procedure from the sleep mode.

Next, the CPU 15 sets a condition for resuming from the sleep mode (hereinafter referred to as a "primary resume condition") in the sleep circuit 152 (for example, data may be stored in a register which is referred to by the sleep circuit 152) (step S21). The primary resume condition is a condition for, when a predetermined input is made to the sleep circuit 152 via the operation switch 14 of the portable game apparatus 1 during sleep mode operation, placing the portable game apparatus 1 out of the sleep mode into a preliminary resume state. In other words, when an operation that matches the primary resume condition is performed, the CPU 15 waits for an input that matches a secondary resume condition (described later), instead of resuming the game processing mode. For example, the primary resume condition may be defined as activation of any arbitrary operation switch 14 or activation of the operation switches 14 in a predetermined combination or order. In the case where activation of any arbitrary operation switch 14 is set as the primary resume condition, the length of time during which that operation switch 14 is continuously pressed may additionally be considered as a condition. For example, the primary resume condition may additionally stipulate that the time which lapses after the operation switch 14 is pressed and until it is released (i.e., after the operation switch 14 is turned on and until it is turned off) must be equal to or less than a predetermined period of time (e.g., 0.5 seconds or 1 second). By additionally considering such a condition, it becomes possible to distinguish whether an operation switch (es) 14 has been pressed down for a longer period of time or not, so that it is possible to more clearly distinguish an input which is meant as an instruction for canceling the sleep mode or not. The primary resume condition may be preset as part of the initial settings of the portable game apparatus 1, or may arbitrarily be altered by the user.

Next, the CPU 15 commences the resume management program stored in the working RAM 17 (step S22) so that, after the CPU 15 has completely entered the sleep mode and taken a standby state based on a wait signal, the resume management program can be readily executed as soon as an input that matches the primary resume condition is made to the sleep circuit 152.

Next, the CPU core 157 assumes a standby state based on a wait signal, and the system clock generation circuit 151 stops supplying a clock signal (step S23). As a result, the portable game apparatus 1 completely enters the sleep mode, and the flow of operation of entering the sleep mode is thus ended. Specifically, the portable game apparatus 1 enters the sleep mode as the CPU core 157 executes a system call "SWI<3>" instruction (stop()). The states of the respective functional blocks during the sleep mode are as follows: the CPU core 157 is in a standby state based on the wait signal; the system clock generation circuit 151 is in a stop state; and the LCD 12, the loudspeaker 13, the I/F 18, the peripheral circuitry 155, and the LCD controller 158 are in a stopped state (because of no clock signal being supplied thereto). The contents of the respective RAMs will be retained because power is being supplied from the power unit 16. In other words, the respective functional blocks during the sleep mode are in such states that only the sleep circuit 152 is in operation in order to determine whether an input made via the operation switches 14 matches the primary resume condition or not, while the other functional blocks are in a standby or stopped state. As a result, the power consumption can be substantially reduced.

On the other hand, if the user selects the "No" option in the transition window displayed on the LCD 12 at step S24, the CPU 15 erases the transition window from the LCD 12 (step S25), and reads the game data and game image saved in the RAM 153 and the VRAM 154 at step S14, thereby restoring the game data and the game image (step S26), and then returns to step S11 to resume the normal game processing mode operation.

Figure 5:
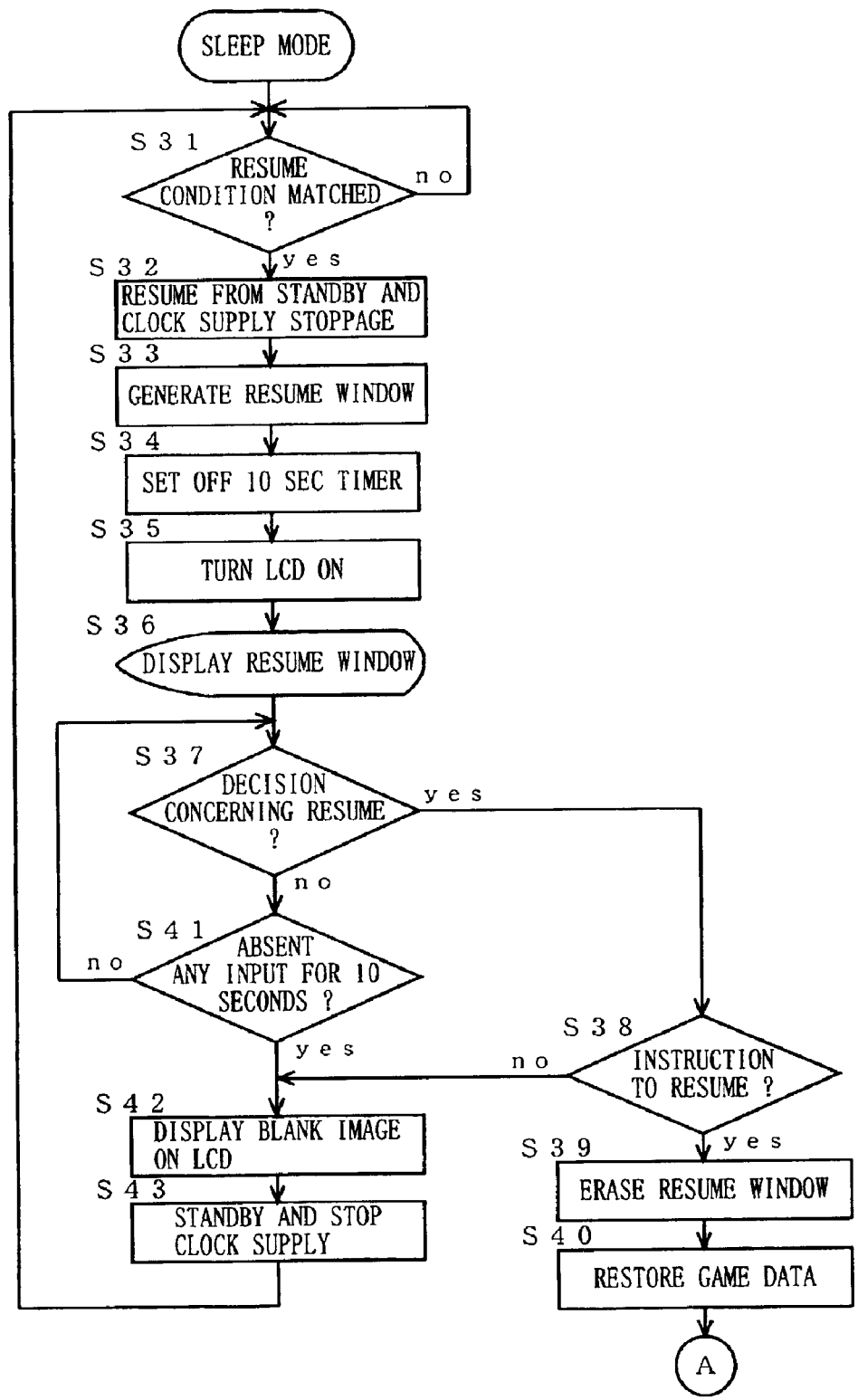
FIG. 5 is a flowchart illustrating an operation of the portable game apparatus 1 in FIG. 1 by which the portable game apparatus 1 resumes from a sleep mode.

Next, an operation of the portable game apparatus 1 by which the portable game apparatus 1 resumes from the sleep mode will be described. FIG. 5 is a flowchart illustrating the operation of the portable game apparatus 1 by which the portable game apparatus 1 resumes from a sleep mode.

Referring to FIGS. 2 and 5, as mentioned above, the respective functional blocks of the portable game apparatus 1 during the sleep mode are in such states that only the sleep circuit 152 is in operation in order to monitor an input made via the operation switches 14. During the sleep mode, the sleep circuit 152 determines whether or not the primary resume condition which is set therewithin matches any input that is made via the operation switches 14 (step S31). For example, in the case where the primary resume condition is defined as activation of any arbitrary operation switch 14, the sleep circuit 152 will determine activation of any operation switch 14 to be compliant with the primary resume condition. Furthermore, in the case where the resume condition additionally stipulates that a given operation switch 14 is continuously pressed for a period equal to or less than 0.5 seconds, the sleep circuit 152 will determine that the primary resume condition has been satisfied when any operation switch 14 is turned on and turned off within 0.5 seconds. In other words, the sleep circuit 152 in this case will determine that the primary resume condition has been not been satisfied if the operation switch 14 is continuously turned on for a longer period (i.e., the operation switch 14 stays pressed down). In the case where the primary resume condition is defined as activation of the operation switches 14 in a predetermined combination or order (e.g., simultaneously pressing the "A" button (the operation switch 14*f*), the "B" button (operation button 14*g*), and the "L" buttons (operation switch 14*b*)), the sleep circuit 152 will determine that the primary resume condition has been satisfied if the prescribed operation switches 14 are turned on in a predetermined combination or order. Thereafter, while it is determined that the input made via the operation switches 14 does not match the primary resume condition, the sleep circuit 152 repeats step S31 to continue in the sleep mode. On the other hand, once it is determined that the input made via the operation switches 14 matches the primary resume condition, the sleep circuit 152 proceeds to the next step S32. Step S31 corresponds to a "first resume determination step" regarding the primary resume condition as defined under the present invention, and the input made via the operation switches 14 corresponds to a "first operation signal" as defined under the present invention.

Next, the sleep circuit 152 sends a flag indicating that the sleep mode is canceled to the CPU core 157, thereby canceling the standby state of the CPU core 157 and the stoppage of clock supply from the system clock generation circuit 151 (step S32). As a result, the standby state of the CPU core 157, the stopped state of the system clock generation circuit 151, and the stopped state (because of no clock signal being supplied thereto) of the LCD 12, the loudspeaker 13, the I/F 18, peripheral circuitry 155, and the LCD controller 158 are all canceled. Thereafter, control proceeds to the next step.

Next, the CPU 15 begins executing the resume management program from the sleep mode, which was commenced at step S22, generates a resume window for allowing the user to confirm whether or not to resume from the sleep mode, and stores the generated resume window in the VRAM 154 (step S33). Thereafter, control proceeds to the next step.

Next, the CPU 15 sets off a ten-second timer (step S34), turns the LCD 12 on (step S35), and causes the resume window to be displayed on the LCD 12 via the LCD controller 158 (step S36).

Figure 6:
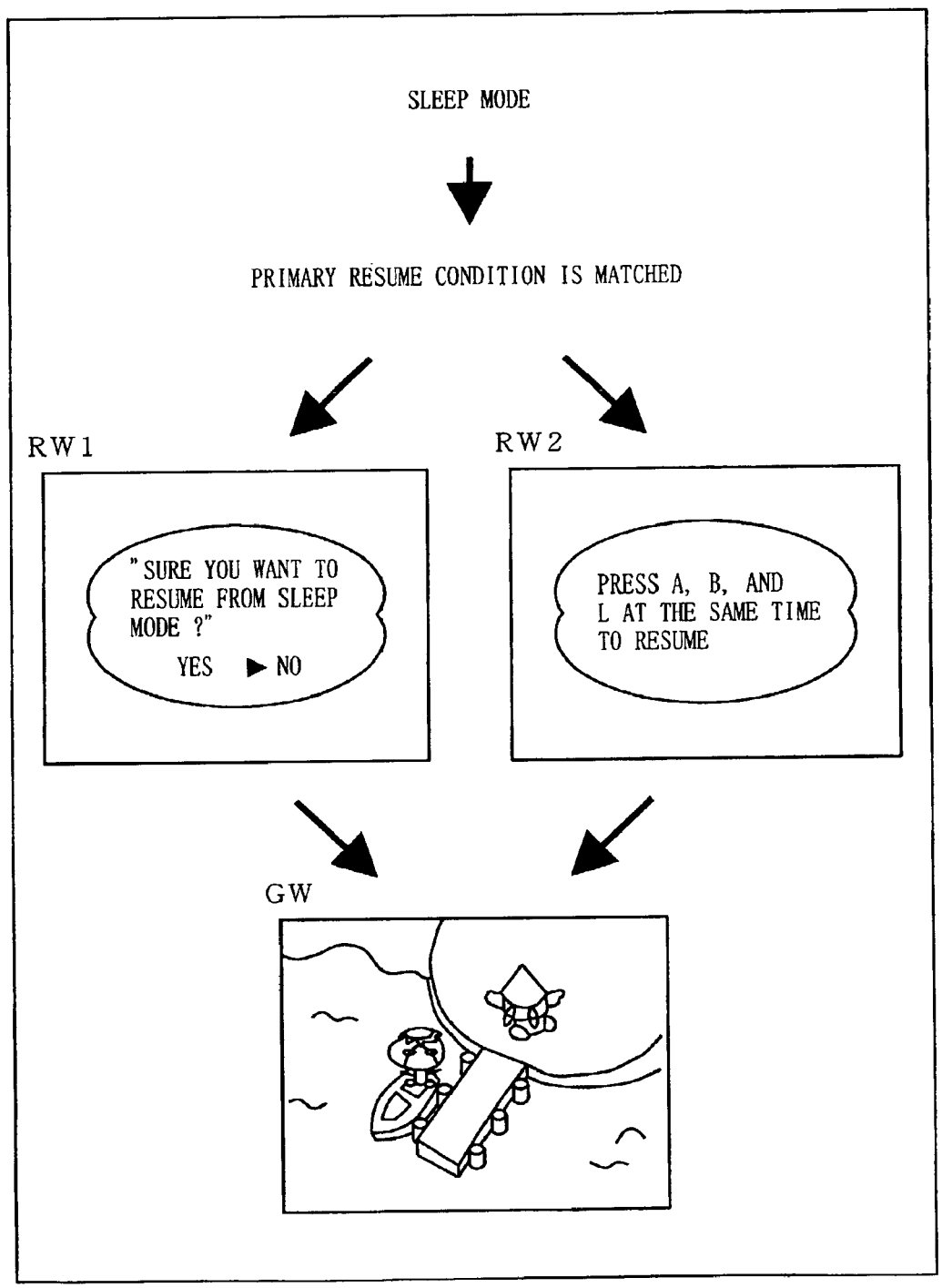
FIG. 6 illustrates exemplary resume windows which may be displayed on the LCD 12 shown in FIG. 1 for returning from a sleep mode.

FIG. 6 illustrates example resume windows which may be displayed on the LCD 12. Referring to FIG. 6, when it is determined at step S31 that an input satisfying the primary resume condition is made during the sleep mode, step S36 is executed to display a resume window RW on the LCD 12. The resume window RW displays a different image depending on the content of the secondary resume condition. For example, in the case where the secondary resume condition is of such a nature that it asks the user to select whether or not to resume from the sleep mode, a resume window RW1 may be displayed on the LCD 12. This exemplary resume window RW1 displays "Sure you want to resume from sleep mode?" to ask the user whether or not to resume from the sleep mode based on a selection of "Yes" or "No". In the resume window RW1, the option of not choosing to resume from the sleep mode (i.e., "No") is pointed to by default. On the other hand, in the case where the secondary resume condition stipulates that a user must make an input via the operation switches 14 in a predetermined combination or order which is not likely to be fortuitously executed as a condition for resuming from the sleep mode, a resume window RW2 may be displayed on the LCD 12. The resume window RW2 displays "Press A, B, and L at the same time to resume" to prompt the user to activate the operation switches 14 in a predetermined combination or order, thereby asking the user whether or not to resume from the sleep mode. The duration (e.g., ten seconds) of the timer which is set at step S34 defines a period for waiting the user to make a decision as to whether or not to resume from the sleep mode based on the resume window RW which is continuously displayed on the LCD 12 during this period.

Next, the CPU 15 determines whether or not a decision concerning a resume from the sleep mode has been made by a user based on the inputs via the operation switches 14 (step S37). This determination is made based on whether: an input which is related to the secondary resume condition is made via the operation switches 14; an input which is unrelated to the secondary resume condition is made via the operation switches 14; or no input is made. The secondary resume condition allows the user to further confirm whether or not to return from the sleep mode to the game processing mode, in addition to the primary resume condition. In other words, when an input that matches the primary resume condition is made to the portable game apparatus 1 via the operation switches 14 during the sleep mode, the portable game apparatus 1 is placed out of the sleep mode into a preliminary resume state. As a further input that matches the secondary resume condition is made to the portable game apparatus 1 via the operation switches 14, the portable game apparatus 1 completely returns from the sleep mode to the game processing mode (i.e., at a particular point in the game processing which existed immediately before entering the sleep mode).

For example, the secondary resume condition may stipulate that a user must choose to resume from among the options displayed on the LCD 12, by making an appropriate input made via the operation switches 14. In this case, if an input is made via the operation switches 14 that indicates an option has been selected, the CPU 15 determines at step S37 that a decision concerning a resume from the sleep mode has been made, and proceeds to step S38. On the other hand, if an input that is unrelated to the options is made via the operation switches 14 or if no input is made via the operation switches 14, the CPU 15 determines at step S37 that a decision concerning a resume from the sleep mode has not been made, and proceeds to step S41.

Alternatively, the secondary resume condition may stipulate that a user must make an input via the operation switches 14 in a predetermined combination or order (which is not likely to be a result of fortuitous pressing) to instruct a resume from the sleep mode. In this case, if an input in the predetermined combination or order is made via the operation switches 14, the CPU 15 determines at step S37 that a decision concerning a resume from the sleep mode has been made, and proceeds to step S38. On the other hand, if an input is made via the operation switches 14 which does not conform to the predetermined combination or order, or if no input is made via the operation switches 14, the CPU 15 determines at step S37 that a decision concerning a resume from the sleep mode has not been made, and proceeds to step S41. The secondary resume condition may be preset as part of the initial settings of the portable game apparatus 1, or may be arbitrarily altered by the user.

Next, if it is determined at step S37 that a decision concerning a resume from the sleep mode has been made based on an input made via the operation switches 14, the CPU 15 then determines whether the input is an instruction for a resume from the sleep mode or not (step S38). For example, in the case where the secondary resume condition stipulates that a user must choose to resume from among the options displayed on the LCD 12 by making an appropriate input made via the operation switches 14, if the user selects the option of resuming from the sleep mode (i.e., "Yes" in the exemplary resume window RW1 shown in FIG. 6), the CPU 15 proceeds to step S39. On the other hand, if the user selects the option of not resuming from the sleep mode (i.e., "No" in the exemplary resume window RW1 in FIG. 6), the CPU 15 proceeds to step S42. In the case where the secondary resume condition stipulates that a user must make an input via the operation switches 14 in a predetermined combination or order to instruct a resume from the sleep mode, however, the CPU 15 does not need to perform step S38 but may directly proceed to step S39 because it has already been determined at step S37 that an input in the predetermined combination or order has been made via the operation switches 14. Steps S37 and S38 correspond to a "second resume determination step" regarding the secondary resume condition as defined under the present invention, and the input made via the operation switches 14 corresponds to a "second operation signal" as defined under the present invention.

Next, the CPU 15 erases the resume window which is currently displayed on the LCD 12 (step S39), and reads the game data and game image saved in the RAM 153 and the VRAM 154 at step S14, thereby restoring the game data and the game image which existed immediately before entering the sleep mode (step S40), and then returns to step S11 to resume the normal game processing mode operation.

On the other hand, if it is determined at step S37 that a decision concerning a resume from the sleep mode has not been made based on an input made via the operation switches 14, the CPU 15 determines whether no input has been made via the operation switches 14 for ten consecutive seconds (step S41). If the period of inactivity concerning the operation switches 14 is less than 10 seconds, the CPU 15 returns to step S37 to wait for the user to make a decision concerning resume. On the other hand, if the period of inactivity concerning the operation switches 14 has exceeded 10 seconds, the CPU 15 proceeds to step S42.

Next, the CPU 15 displays a blank image on the LCD 12 in order to erase the resume window from the LCD 12 (step S42). Although erasure of the display on the LCD 12 could instead be achieved by stopping the operation of the LCD controller 158, it is preferable to display a blank image because, if the LCD controller 158 is stopped first, noise and the like may appear on the LCD 12. Thereafter, control proceeds to the next step S43.

Next, the CPU core 157 assumes a standby state based on a wait signal, and the system clock generation circuit 151 stops supplying a clock signal (step S43). As a result, the portable game apparatus 1 again enters the sleep mode, and returns to step S31 to wait for an input satisfying the aforementioned primary resume condition. That is, unless the secondary resume condition is satisfied, the portable game apparatus 1 does not return to the game processing mode for performing game processing, but instead enters the sleep mode again.

Thus, the portable game apparatus 1 is capable of operating in a power save mode (sleep mode) with a minimum power consumption. Since two resume conditions need to be satisfied in order to resume the game processing mode, the portable game apparatus 1 is prevented from inadvertently returning to the game processing mode in the absence of a proper user instruction. In other words, even when the portable game apparatus 1 comes in contact with surrounding objects as it is carried around by a user in a bag or a pocket while in the power save mode, the portable game apparatus 1 is prevented from inadvertently returning to the game processing mode due to the pressing of the protruding operation buttons, so that any unintended progress in the game can be forestalled. Furthermore, since a resume procedure for returning to the game processing mode is presented to the user, the user will find it easy to resume from the power save mode without having to remember the procedure, and the user is also not driven to turn off the entire game apparatus 1 by mistake.

Figure 7:
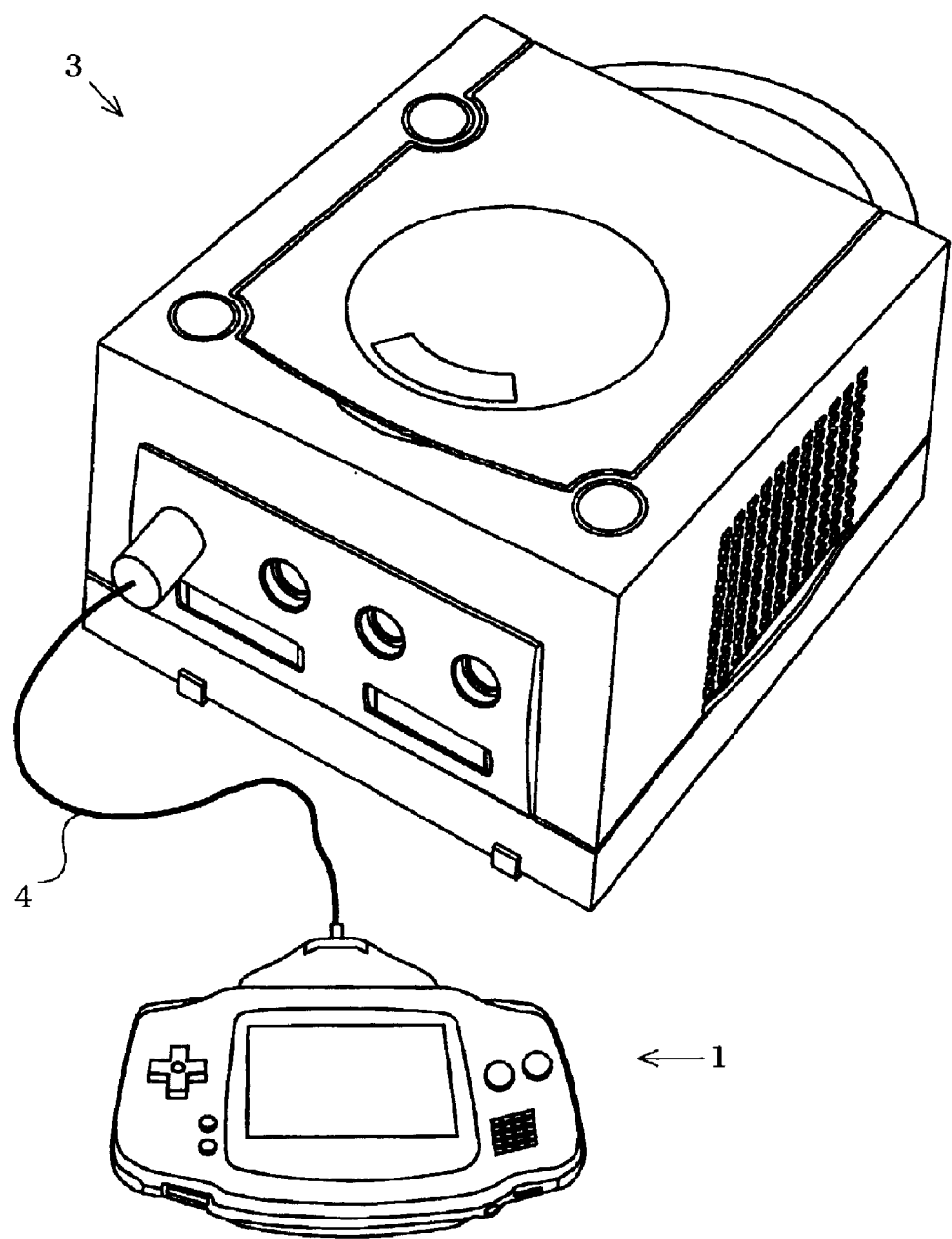
FIG. 7 is an overall view showing the portable game apparatus 1 of FIG. 1 downloading a game program stored in a non-portable type game apparatus 3.

The above embodiment illustrates an example where the portable game apparatus 1 is connected to the cartridge 2 to perform game processing, and can be carried around as such. However, as shown in FIG. 7, the present invention would be particularly useful in the case where the portable game apparatus 1 is connected to a non-portable type game apparatus 3 so as to allow a game program and the like to be downloaded from the non-portable type game apparatus 3 to the portable game apparatus 1, which can then be disconnected so as to be carried around alone. Specifically, the portable game apparatus 1 is first connected to the non-portable type game apparatus 3 via a predetermined connection cord 4 or the like. Then, a game controlling program, image data, audio data, a sleep mode management program, and the like for the portable game apparatus 1, which may be stored in a storage medium (e.g., DVD-ROM) within the non-portable type game apparatus 3, are downloaded to the portable game apparatus 1 via the connection cord 4. These programs and data are stored in the working RAM 17 within the portable game apparatus 1, for example. Then, the connection cord 4 is detached from the portable game apparatus 1, after which the user is capable of playing on the portable game apparatus 1 the game program which was stored in the non-portable type game apparatus 3. Although the portable game apparatus 1 is operating without the cartridge 2 being connected thereto, the portable game apparatus 1 can operate in a manner similar to being connected to the cartridge 2 because the programs and data which are necessary for the operation are already stored in the portable game apparatus 1. It will be appreciated that, since a sleep mode management program is previously stored in the portable game apparatus 1, the sleep mode transition and resume from the sleep mode can occur in the manner described above. Since the portable game apparatus 1 which is operating in this state will lose all of the program stored in its RAM once the portable game apparatus 1 is turned off or the power runs out, the power save mode management program according to the present invention will be especially useful in allowing the user to enjoy the game for longer periods of time.

As described above, the portable game apparatus 1 is capable of operating in a power save mode (sleep mode) with a minimum power consumption also in the case where a game program previously stored in the non-portable type game apparatus 3 is downloaded thereto so that the portable game apparatus 1 is operated without the cartridge 2 being connected thereto. In the case where the portable game apparatus 1 is operated without the cartridge 2 being connected thereto, i.e., isolated from the back-up RAM 22, it would not be practical to save the data in the middle of a game and turn off the portable game apparatus 1. Instead, the above-described power save mode can be effectively utilized to temporarily save the data in the middle of a game, thereby enhancing the utility of the portable game apparatus 1.

While the invention has been described in detail, the foregoing description is in all aspects illustrative and not restrictive. It is understood that numerous other modifications and variations can be devised without departing from the scope of the invention.

What is claimed is:

1. A power save mode management program contained in a medium which is readable to a computer embodying game apparatus having a power save mode for minimizing internal power consumption, wherein the power save mode management program controls transition to the power save mode and resume from the power save mode, the program comprising:

a first resume determination step of determining, during the power save mode, whether a first operation signal generated from an operation switch provided on the game apparatus matches a predetermined primary resume condition or not;

a power save mode cancellation step of canceling the power save mode if the first resume determination step determines that the first operation signal matches the primary resume condition;

a second resume determination step of determining, after the power save mode cancellation step cancels the power save mode, whether a second operation signal generated from the operation switch matches a predetermined secondary resume condition or not; and a game processing mode resume step of resuming a game processing mode being processed by the game apparatus immediately before entering the power save mode if the second resume determination step determines that the second operation signal matches the secondary resume condition.

2. The power save mode management program according to claim 1, further comprising a operation procedure displaying step of displaying an operation procedure for generating the second operation signal when the power save mode is cancelled by the power save mode cancellation step.

3. The power save mode management program according to claim 2, wherein the operation procedure displaying step comprises displaying a plurality of options, and the secondary resume condition is an option to resume from the power save mode selected by a user from among the options displayed by the operation procedure displaying step.

4. The power save mode management program according to claim 2, wherein the operation procedure displaying step comprises indicating a combination of a plurality of said operation switches, and the secondary resume condition is an operation signal generated corresponding to the combination of the plurality of said operation switches indicated by the operation procedure displaying step.

5. The power save mode management program according to claim 1, further comprising a power save mode re-transition step of again establishing the power save mode if the second operation signal is not generated within a predetermined period of time after the power save mode is canceled by the power save mode cancellation step.

6. The power save mode management program according to claim 1, wherein the primary resume condition is the first operation signal being generated during a period which is equal to or less than a predetermined period of time.

7. The power save mode management program according to claim 1, wherein the primary resume condition is an operation signal generated from a predetermined combination of a plurality of said operation switches.

8. The power save mode management program according to claim 1, further comprising an operation procedure displaying step of displaying an operation procedure for generating the first operation signal when entering the power save mode.

9. The power save mode management program according to claim 1, further comprising:

a game data saving step of saving game data being used in the game processing mode upon determining that a third operation signal generated from the operation switch matches a predetermined primary transition condition or that no operation signal has been generated for a predetermined period of time during the game processing mode; and a power save mode transition step of, after the game data is saved, commencing the first resume determination step, and thereafter establishing the power save mode.

10. The power save mode management program according to claim 9, further comprising a transition window displaying step of displaying a transition window for allowing a user to confirm whether or not to enter the power save mode before the first resume determination step is commenced.

11. A game apparatus having a power save mode for minimizing internal power consumption, comprising:

an operation switch provided on a surface of a housing of the game apparatus for generating an operation signal in response to a user operation;

a first resume determination section for determining whether a first operation signal generated from the operation switch during the power save mode matches a predetermined primary resume condition or not;

a power save mode cancellation section for canceling the power save mode when the first resume determination section determines that the first operation signal matches the primary resume condition;

a second resume determination section for determining whether a second operation signal generated from the operation switch after the power save mode is canceled by the power save mode cancellation section matches a predetermined secondary resume condition or not; and a game processing mode resume section for resuming the game processing mode being processed by the game apparatus immediately before entering the power save mode if the second resume determination section determines that the second operation signal matches the secondary resume condition.

12. The game apparatus according to claim 11, further comprising an operation procedure displaying section for displaying an operation procedure for generating the second operation signal when the power save mode is cancelled by the power save mode cancellation section.

13. The game apparatus according to claim 12, wherein the operation procedure displaying section displays a plurality of options, and the secondary resume condition is an option to resume from the power save mode selected by a user from among the options displayed by the operation procedure displaying section.

14. The game apparatus according to claim 12, wherein the operation procedure displaying section indicates a combination of a plurality of said operation switches, and the secondary resume condition is an operation signal generated corresponding to the combination of the plurality of said operation switches indicated by the operation procedure displaying section.

15. The game apparatus according to claim 11, further comprising a power save mode re-transition section for again establishing the power save mode if the second operation signal is not generated within a predetermined period of time after the power save mode is canceled by the power save mode cancellation section.

16. The game apparatus according to claim 11,
wherein the primary resume condition is the first operation signal being generated during a period which is equal to or less than a predetermined period of time.

17. The game apparatus according to claim 11,
wherein the primary resume condition is an operation signal generated from a predetermined combination of a plurality of said operation switches.

18. The game apparatus according to claim 11, further comprising an operation procedure displaying section for displaying an operation procedure for generating the first operation signal when entering the power save mode.

19. The game apparatus according to claim 11, further comprising:

a game data saving section for saving game data being used in the game processing mode upon determining that a third operation signal generated from the operation switch matches a predetermined primary transition condition or that no operation signal has been generated for a predetermined period of time during the game processing mode; and a power save mode transition section for, after the game data is saved, commencing the first resume determination section, and thereafter establishing the power save mode.

20. The game apparatus according to claim 19, further comprising a transition window displaying section for displaying a transition window for allowing a user to confirm whether or not to enter the power save mode before commencing the first resume determination section.

* * * * *

UNITED STATES PATENT AND TRADEMARK OFFICE
CERTIFICATE OF CORRECTION

PATENT NO. : 6,948,083 B2
DATED : September 20, 2005
INVENTOR(S) : Eguchi et al.

It is certified that error appears in the above-identified patent and that said Letters Patent is hereby corrected as shown below:

Title page, Item [54] and Column 1, line 1,
Title, change "GAME APPARATUS AND A POWER SAVE MODE MANAGEMENT PROGRAM EXECUTED BY THE SAME" to -- GAME APPARATUS THAT VERIFIES A SECONDARY RESUME CONDITION TO TRANSITION FROM POWER SAVE MODE TO GAME PROCESSING MODE --.

Signed and Sealed this

Twenty-eighth Day of February, 2006

JON W. DUDAS
*Director of the United States Patent and Trademark Office*